(12) United States Patent
Zhu

(10) Patent No.: US 11,056,736 B2
(45) Date of Patent: Jul. 6, 2021

(54) BATTERY COOLING SYSTEM FOR ENERGY VEHICLE

(71) Applicant: Gong Zhu, Xiamen (CN)

(72) Inventor: Gong Zhu, Xiamen (CN)

( * ) Notice: Subject to any disclaimer, the term of this patent is extended or adjusted under 35 U.S.C. 154(b) by 0 days.

(21) Appl. No.: 17/033,701

(22) Filed: Sep. 26, 2020

(65) Prior Publication Data
US 2021/0104791 A1   Apr. 8, 2021

(30) Foreign Application Priority Data
Oct. 8, 2019   (CN) .......................... 201910947783.7

(51) Int. Cl.
| | | |
|---|---|---|
| *H01M 10/6556* | (2014.01) | |
| *H01M 10/613* | (2014.01) | |
| *H01M 10/658* | (2014.01) | |
| *H01M 10/625* | (2014.01) | |
| *H01M 10/44* | (2006.01) | |
| *H01M 10/6554* | (2014.01) | |

(52) U.S. Cl.
CPC ....... *H01M 10/6556* (2015.04); *H01M 10/44* (2013.01); *H01M 10/613* (2015.04); *H01M 10/625* (2015.04); *H01M 10/658* (2015.04); *H01M 10/6554* (2015.04)

(58) Field of Classification Search
CPC .......... H01M 10/6556; H01M 10/613; H01M 10/625; F28D 11/0445; F28F 5/02; F04B 3/00; F04B 9/00; F04B 9/08
See application file for complete search history.

(56) References Cited

U.S. PATENT DOCUMENTS 6,684,941 B1 * 2/2004 Cao .................... F04B 17/04
165/104.25

FOREIGN PATENT DOCUMENTS

| CN | 108390124 A | | 8/2018 |
|---|---|---|---|
| CN | 208622898 U | | 3/2019 |
| CN | 110061327 A | * | 7/2019 |
| CN | 110061327 A | | 7/2019 |

OTHER PUBLICATIONS

Espacenet Translation of CN11061327A (Year: 2019).*

* cited by examiner

*Primary Examiner* — Maria Laios
*Assistant Examiner* — Jordan E Berresford

(57) ABSTRACT

A device has a shield boxes with a plurality of batteries installed, an inner wall of the shield box has a condenser pipe filled with coolant, a cylinder rotatably connects with an inner bottom of the shield box, an upper end of the cylinder has a circular groove arranged coaxially with the cylinder, the circular groove is sealed and rotated to connect with a circular block, a water inlet end and a water outlet end of the condenser pipe are both sealed and penetrated through the circular block, a heat insulation plate is arranged in the cylinder, the heat insulation plate divides the cylinder into two insulation chambers of the same size, an upper end of the cylinder is provided with two through holes communicating with the circular groove, a driving device for driving the cylinder to rotate is installed in the cylinder.

1 Claim, 3 Drawing Sheets

BATTERY COOLING SYSTEM FOR ENERGY VEHICLE

CROSS-REFERENCE TO RELATED APPLICATIONS

This application claims priority benefit of Chinese Patent Application No. 201910947783.7 filed on 8 Oct. 2019. The above-referenced application is hereby incorporated herein by reference.

BACKGROUND OF THE INVENTION

The invention relates to new energy vehicles, especially to battery cooling systems for new energy vehicles.

New energy vehicles driven by electric energy are also called electric vehicles, and their power sources mainly include lithium-ion batteries, nickel-hydrogen batteries, fuel cells, and lead-acid batteries. During driving of electric vehicles, due to heating effect of current, batteries in vehicles will generate high temperature, and when temperature is too high, it will seriously affect performance and life of the battery. In existing technical means, in order to solve this problem, most of heat dissipation is performed by a cooling fan, for example, "New energy vehicle battery heat sink" is disclosed by Chinese patent application No. 2018212414035, publication No. CN208622898U, solution of the application detects temperature in battery box through a temperature sensor, and turns on a fan to dissipate heat when temperature in the vehicle battery box is higher than a set value. The air-cooling mode is mainly that cold air is forced to flow across battery surface to cool down the battery, it is difficult to achieve good heat dissipation effect only relying on air cooling. There is also a circulating water pump that drives coolant to circulate to dissipate heat, for example, "New energy vehicle battery heat sink" is disclosed by Chinese application 2018101391104, publication No. CN108390124A. In this solution, a container for fixing battery is placed in water, and a circulating water pump is driven by electric energy from vehicle battery to perform water circulation and heat dissipation. This heat dissipation method has following disadvantages. 1. Water pump is still powered by the battery, which will increase output power of the battery, further causing the battery to heat up, and heat dissipation effect is average. 2. Using battery power to drive the water pump will reduce output power of the battery, resulting in a limited distance for the vehicle to travel after a full charge. 3. Increasing power load increases internal loss of the battery, which ultimately reduces service life of the battery. In view of the above technical shortcomings, this application discloses a battery cooling system for new energy vehicle.

BRIEF SUMMARY OF THE INVENTION

The present invention aims to provide a battery cooling system for new energy vehicle so as to solve the shortcomings in the prior art. Different heating conditions of chambers on both sides of a cylinder cause a sliding plug to move up and down, which in turn pushes a coolant in a condenser pipe to flow, thereby quickly dissipating heat in a battery. It is driven by heat emitted by the battery, there is no need to consume battery power, which not only speeds up heat dissipation of the battery, but also reduces a load on the battery, which can extend service life of the battery.

Such object is achieved by providing a battery cooling system for new energy vehicle, the cooling system comprises a shield boxes with a plurality of batteries installed. An inner wall of the shield box is provided with a condenser pipe filled with coolant, a cylinder rotatably connects with an inner bottom of the shield box, an upper end of the cylinder is provided with a circular groove arranged coaxially with the cylinder, the circular groove is sealed and rotated to connect with a circular block, a water inlet end and a water outlet end of the condenser pipe are both sealed and penetrated through the circular block, a heat insulation plate is arranged in the cylinder, the heat insulation plate divides the cylinder into two insulation chambers of the same size, an upper end of the cylinder is provided with two through holes communicating with the circular groove, the two through holes are respectively matched with the water inlet end and the water outlet end of the condenser pipe, a driving device for driving the cylinder to rotate is installed in the cylinder.

Preferably, the driving device comprises two sliding plugs respectively sealed and slidingly connected in the insulation chambers on both sides of the heat insulation plate, an enclosed space formed by the sliding plug, the cylinder, and the heat insulation plate are filled with a thermal expansion liquid, an iron block is embedded on a side wall of the sliding plug, a permanent magnet is installed on a side wall of the shield box, two opposite side walls of the shield box are respectively provided with an air inlet hole and an air outlet hole, the cylinder and the sliding plug are made of copper material which has good thermal conductivity.

Preferably, an spoiler made of iron is slidingly connected with each side of the heat insulation plate, the spoiler is elastically connected to an inner bottom of the cylinder by a spring, an electromagnet is installed on a side wall of the shield box, the electromagnet is coupled in charging circuit of the battery.

Advantageous Effects (1) Thermal expansion liquid in a cavity on a side of a cylinder near a battery absorbs heat emitted by the battery, the expansion liquid expands to push a sliding plug upward. Temperature of a cavity on a side of the cylinder close to an air inlet hole gradually decreases after being blown by wind, and the thermal expansion liquid in the cavity gradually retracts, causing the sliding plug in the cavity to move down, which can push coolant in condenser pipe to flow so as to quickly dissipate heat in the battery.

(2) When the sliding plug in a heat absorption side chamber moves up to a position opposite to a permanent magnet, an iron block on the sliding plug is attracted by a permanent magnet, which makes the cylinder rotate 180 degrees so that the heat absorption side chamber of the cylinder is close to air inlet holes for heat dissipation. Original heat dissipation side chamber is close to the battery to absorb heat, so that the sliding plugs in the chambers on both sides move up and down again. Under action of the permanent magnet, the cylinder rotates again by 180 degrees. This cyclical action makes the cylinder continue to rotate while a vehicle is running, so that coolant continues to flow to keep cooling the battery. The device does not need to consume battery power, and is driven by heat emitted by the battery, which not only accelerates heat dissipation speed of the battery, but also reduces a load of the battery, which can extend service life of the battery.

(3) Output power of the battery increases as vehicle speed increases, and temperature of the battery also increases, at the same time, as vehicle speed increases, speed of air flowing from air inlet holes also increases. This makes a chamber on a heated side of the cylinder absorb heat faster, and a chamber on a heat dissipation side of the cylinder also dissipates heat faster, thereby accelerating frequency of the sliding plug moving up and down. So as to speed up rotation speed of the cylinder, thereby speed up liquid flow in the condenser pipe, and finally improve heat dissipation effect, therefore, heat dissipation capacity of the device can be self-adjusted according to vehicle operating conditions.

(4) Since an electromagnet is set in charging circuit of the battery, the electromagnet generates magnetic force when charging, a charger turns alternating current into direct current with the same direction but constantly changing current, so that magnetic force of the electromagnet also changes continuously. Under action of a spring, a spoiler in the chamber on a side of the cylinder close to the electromagnet is constantly shaking, which can stir and dissipate thermal expansion liquid in the cavity. The sliding plug in the chamber can be moved down quickly even when there is no wind, and flow speed of the coolant in the condenser pipe is ensured, so that the device has a high heat dissipation capacity when charging.

(5) High-speed airflow generated when the vehicle is driving blows to a chamber on a side of the cylinder near air inlet holes, which can cool and dissipate coolant flowing into the cavity. There is no need to configure related equipments to dissipate the coolant in the condenser pipe, which further reduces a burden on the battery, improves vehicle endurance, and increases service life of the battery.

(6) Setting air inlet holes at a lower end of a side wall of a shield box not only realizes heat dissipation of thermal expansion liquid and coolant in a chamber on a side of the cylinder close to air inlet holes, but also reduces transparent area of the shield box, making the shield box more effective. Both protection performance and heat dissipation performance of the battery achieve better results.

(7) An outer peripheral surface of the cylinder is provided with vertical ribs parallel to wind direction of air inlet holes, and air flow sweeps across surface of vertical ribs and takes away heat of the cylinder while not generating resistance to rotation of the cylinder.

(8) An outer peripheral surface of the cylinder is provided with recesses parallel to wind direction of air inlet holes, and air flow sweeps across surface of recesses and takes away heat of the cylinder while not generating resistance to rotation of the cylinder.

BRIEF DESCRIPTION OF THE SEVERAL VIEWS OF THE DRAWINGS

Further characteristics and advantages of the invention will emerge from the description of preferred, but not exclusive embodiments of an battery cooling system for new energy vehicle according to the invention, non-limiting examples of which are provided in the attached drawings, in which.

Figure 1:
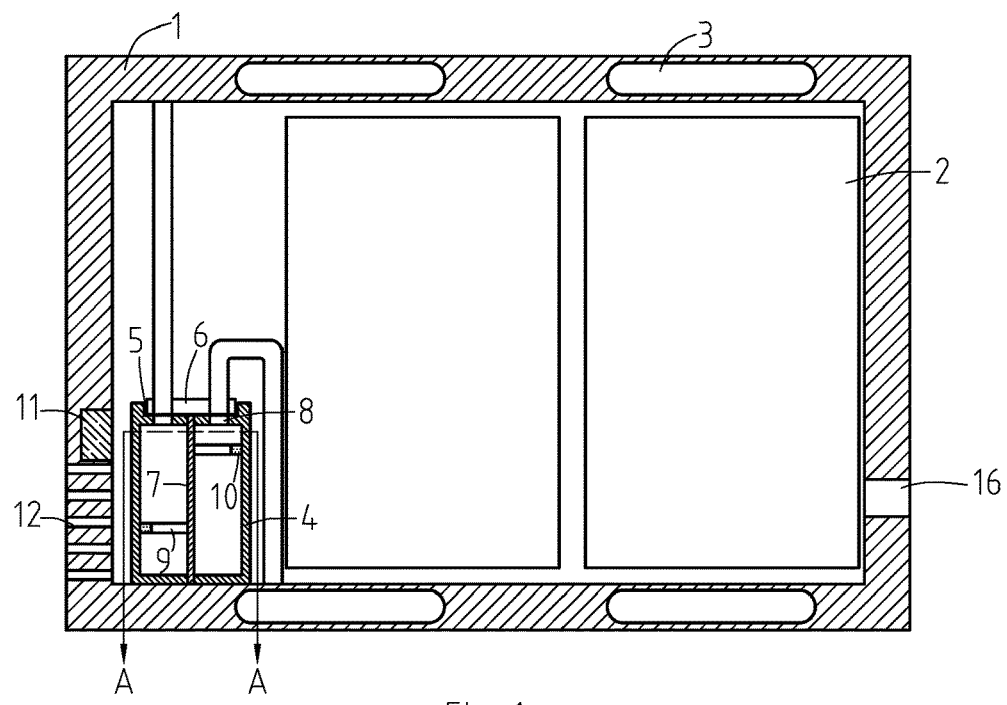
FIG. 1 is a structure drawing of an battery cooling system for new energy vehicle in embodiment 1.

| List of Reference Characters | |
|---|---|
| 1. shield box; | 2. battery; |
| 3. condenser pipe; | 4. cylinder; |
| 5. circular groove; | 6. circular block; |
| 7. heat insulation plate; | 8. through hole; |
| 9. sliding plug; 10. iron block; | 11. permanent magnet; |
| 12. air inlet hole; | 13. spoiler; |
| 14. electromagnet; | 15. spring; |
| 16. air outlet hole; | 17. rib; |
| 18. recess. | |

DETAILED DESCRIPTION OF THE INVENTION

In description of the present invention, it needs to be understood that terms "upper", "lower", "front", "rear", "left", "right", "top", "bottom", "inner", "outer", etc. indicate orientation or positional relationships is based on the position or position relationship shown in the picture, it is only for convenience of describing the present invention and simplifying the description, rather than indicating or implying that the device or element referred to must have a specific orientation, be constructed and operated in a specific orientation, therefore, it cannot be understood as a limitation to the present invention.

Embodiment 1

Figure 2:
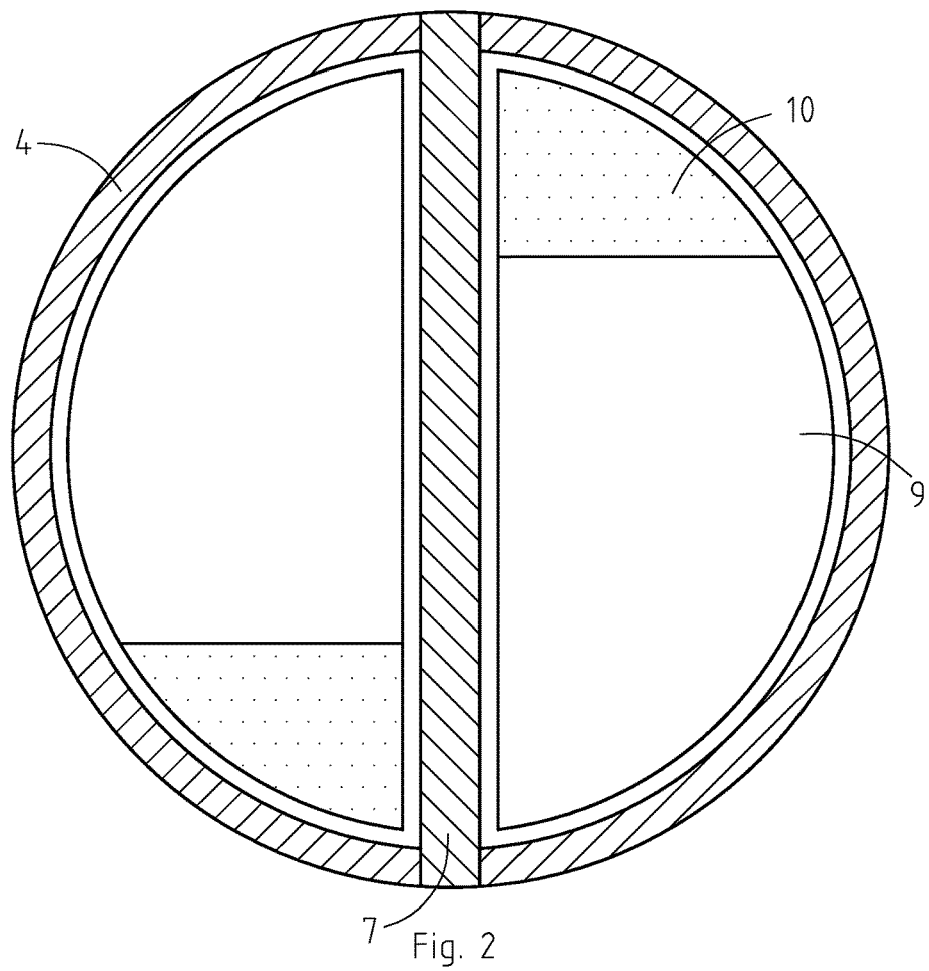
FIG. 2 is a structure drawing of A-A in FIG. 1.

Referring to FIGS. 1-2, a battery cooling system for new energy vehicle comprises a shield boxes 1 with a plurality of batteries 2 installed inside, an inner wall of the shield box 1 is provided with a condenser pipe 3 filled with coolant, it should be noted that the condenser pipe 3 is distributed in a serpentine shape on the inner wall of the shield box 1 to increase contact area with the battery 2, so as to efficiently dissipate heat. A cylinder 4 rotatably connects with an inner bottom of the shield box 1, an upper end of the cylinder 4 is provided with a circular groove 5 arranged coaxially with the cylinder 4, the circular groove 5 is sealed and rotated to connect with a circular block 6, a water inlet end and a water outlet end of the condenser pipe 3 are both sealed and penetrated through the circular block 6. A heat insulation plate 7 is arranged in the cylinder 4, it should be noted that the heat insulation plate 7 is filled with asbestos which has good insulation performance. The heat insulation plate 7 is arranged to a center line of the cylinder 4, the heat insulation plate 7 divides the cylinder 4 into two insulation chambers of the same size, an upper end of the cylinder 4 is provided with two through holes 8 communicating with the circular groove 5, the two through holes 8 are respectively matched with the water inlet end and the water outlet end of the condenser pipe 3, a driving device for driving the cylinder 4 to rotate is installed in the cylinder 4. When the cylinder 4 is installed, place air inlet holes 12 on a side facing wind when the vehicle is driving.

The driving device comprises two sliding plugs 9 respectively sealed and slidingly connected in the insulation chambers on both sides of the heat insulation plate 7, an enclosed space formed by the sliding plug 9, the cylinder 4, and the heat insulation plate 7 is filled with a thermal expansion liquid, the thermal expansion liquid is ethanol with a high thermal expansion coefficient. An iron block 10 is embedded on a side wall of the sliding plug 9, a permanent magnet 11 is installed on a side wall of the shield box 1, two opposite side walls of the shield box 1 are respectively provided with an air inlet hole 12 and an air outlet hole 16, the cylinder 4 and the sliding plug 9 are made of copper material which has good thermal conductivity.

It should be noted that the iron block 10 is arranged at an edge of a side wall of the sliding plug 9, and the iron blocks 10 on the two sliding plugs 9 are arranged symmetrically along an axis of the cylinder 4. When the sliding plug 9 in a heat side chamber moves upward to face the permanent magnet 11, attraction of the permanent magnet 11 to the iron block 10 on the sliding plug 9 can deflect the cylinder 4. The iron block 10 on the sliding plug is attracted to fit the permanent magnet 11 so that the cylinder 4 rotates 180 degrees.

In this embodiment, when the vehicle is running, high-speed air is blown from the air inlet holes 12 to a side of the cylinder 4 close to the air inlet holes 12, and a side of the cylinder 4 close to the battery 2 absorbs heat emitted by the battery 2. Due to heat insulation effect of the heat insulation plate 7, the cylinder 4 is divided into a heat absorption side chamber and a heat dissipation side chamber.

Figure 4:
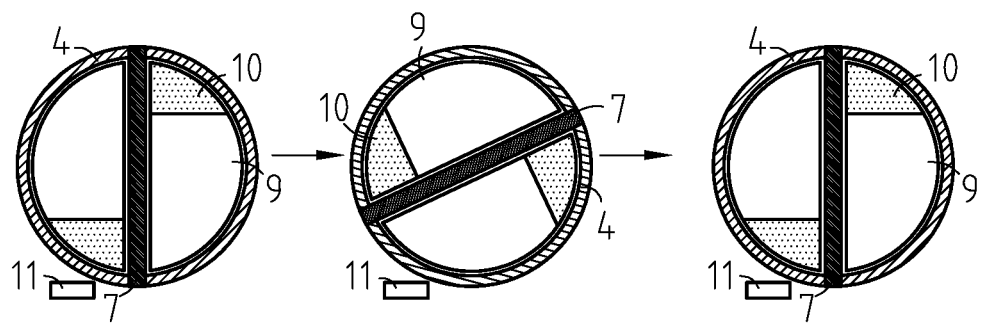
FIG. 4 is a drawing showing different positions of sliding plug, iron block, and permanent magnet in a rotation process of a cylinder.

Temperature of the heat absorption side chamber gradually rises, and the thermal expansion liquid inside the chamber expands after absorbing heat and pushes the sliding plug 9 in the chamber to move upward. Temperature of the heat dissipation side chamber gradually decreases after being blown by wind, and the thermal expansion liquid inside the chamber also retracts a corresponding distance as temperature changes, causing the sliding plug 9 in the chamber to move down. In this way, the sliding plug 9 on one side of the cylinder 4 moves up and the sliding plug 9 on another side moves down, which can push the coolant in the condenser pipe 3 to flow. When the sliding plug 9 on the heat absorption side chamber moves up and close to the permanent magnet 11, the sliding plug 9 on the heat dissipation side chamber moves down and away from the permanent magnet 11. The iron block 10 on the sliding plug 9 on the heat absorption side chamber is attracted by the permanent magnet 11 and the cylinder 4 rotates 180 degrees, position changes are shown in FIG. 4. The heat absorption side chamber is close to the air inlet hole 12 to dissipate heat, while the heat dissipation side chamber is close to the battery 2 to absorb heat, gradually changing the position of the sliding plug 9 in the cylinder 4 again. Under magnetic force of the permanent magnet 11, the cylinder 4 is again rotated by 180 degrees. Such a cyclic operation can make the cylinder 4 continue to rotate, thereby causing the two sliding plugs 9 in the cylinder 4 to continuously move up and down, which can continue to circulate the coolant in the condenser pipe 3, thereby cooling the battery 2.

When vehicle speed increases, air speed blown from the air inlet holes 12 to the heat dissipation side chamber of the cylinder 4 is also increased, and the heat dissipation side chamber of the cylinder 4 can be quickly dissipated. At the same time, increase of vehicle speed also increases output power of the battery 2, which can produce higher temperature. Thereby increasing temperature difference between the battery 2 and the heat absorption side chamber of the cylinder 4, speeding up heat absorbing speed of the heat absorption side chamber, In this way, frequency of up and down movement of the two sliding plugs 9 in the cylinder 4 is also increased, and at the same time rotation speed of the cylinder 4 is increased, and finally speed of liquid in the condenser pipe 3 is accelerated. Thereby improving heat dissipation effect of the device, therefore, the device has function of self-adjusting heat dissipation effect according to vehicle driving situation.

Embodiment 2

Figure 3:
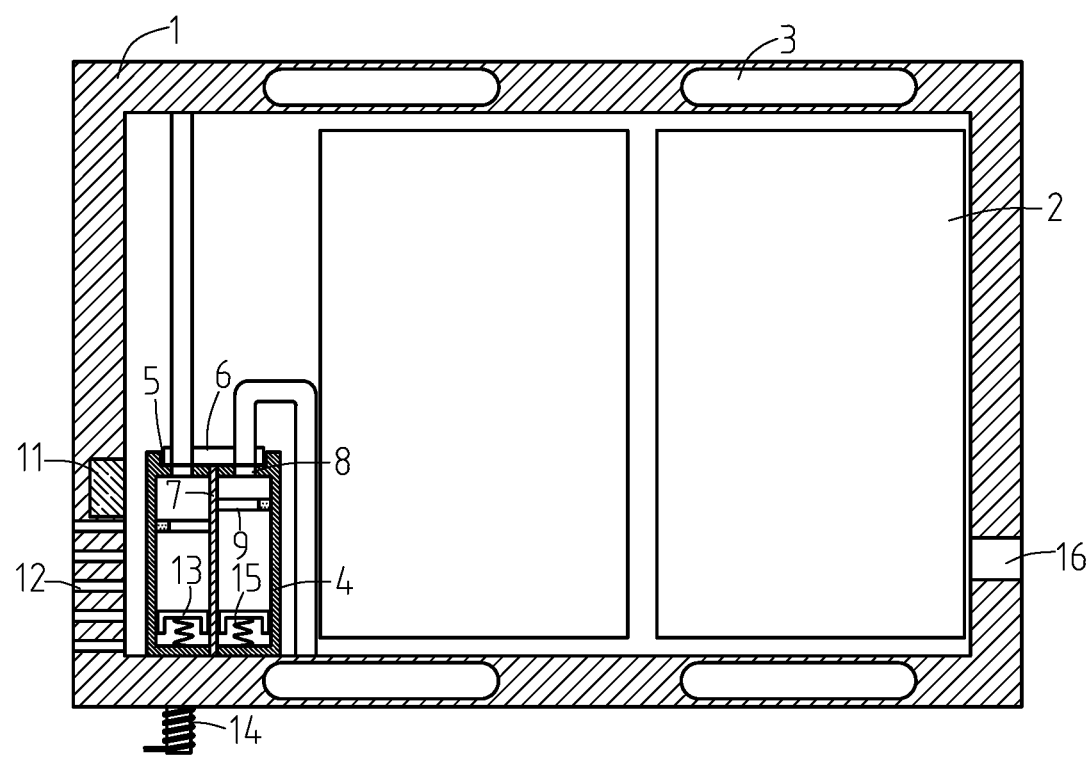
FIG. 3 is a structure drawing of an battery cooling system for new energy vehicle in embodiment 2.

Referring to FIG. 3, difference from embodiment 1 is that an spoiler 13 made of iron is slidingly connected with each side of the heat insulation plate 7, the spoiler 13 is elastically connected to an inner bottom of the cylinder 4 by a spring 15, an electromagnet 14 is installed on a side wall of the shield box 1, the electromagnet 14 is coupled in charging circuit of the battery 2.

It should be noted that the spoiler 13 has alar plates on both sides, so that the spoiler 13 has a shape of a cover as a whole. The spoiler 13 in the chamber on a side close to the air inlet hole 12 is set above the electromagnet 14. This arrangement can shield magnetic force generated by the electromagnet 14 during charging to prevent magnetic force of the electromagnet 14 from acting on the iron block 10 on the sliding plug 9.

In this embodiment, when the vehicle is in a stationary state during charging, heat dissipation effect on the heat dissipation side of the cylinder is not ideal. However, under action of a charger, the charger converts alternating current into direct current with a constant direction and changing value. The permanent magnet 11 generates a magnetic field whose magnetic force changes with current when charging. Under action of changing magnetic force and elastic force of the spring 15, the spoiler 13 vibrates at high frequency. Thereby agitating the thermal expansion liquid in the heat dissipation side chamber to make it cool quickly, so that the sliding plug 9 in the chamber can move down faster, so as to ensure a faster flow of the coolant in the condenser pipe 3. Therefore, when the vehicle is charging, the device can also efficiently dissipate the battery 2.

Embodiment 3

Figure 5:
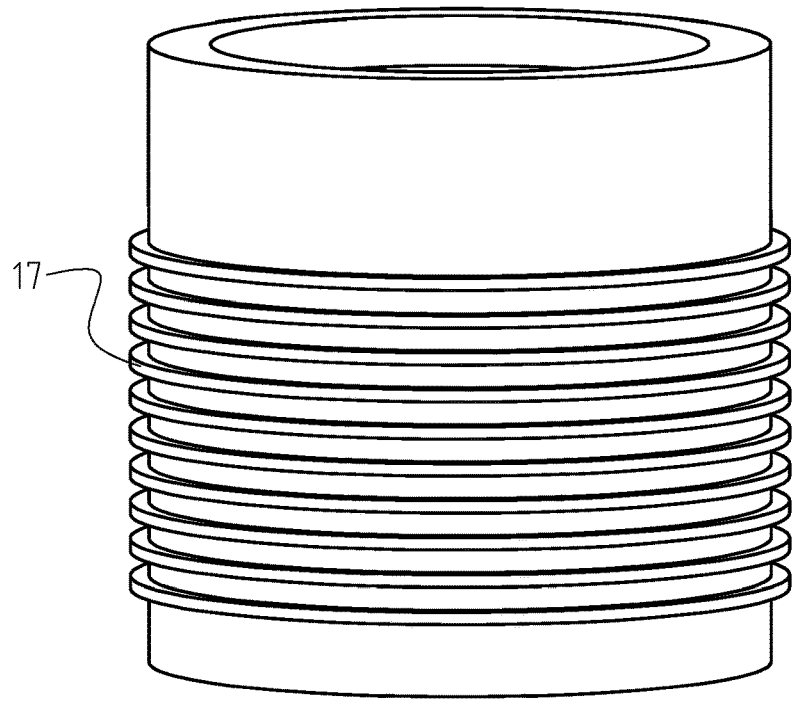
FIG. 5 is a 3d-drawing of a cylinder in embodiment 3.

Referring to FIG. 5, an outer peripheral surface of a cylinder 4 is provided with a plurality of vertical ribs 17 in parallel along an axial direction of the cylinder 4, the vertical ribs 17 are perpendicular to the outer peripheral surface of the cylinder 4 and are arranged radially outward, a channel formed between adjacent vertical ribs 17 is used to receive air flow from air inlet holes 12, the channel is arranged in parallel with the air inlet holes 12, such arrangement achieves that air flow sweeps across surface of the vertical ribs 17 and takes away heat of the cylinder 4 while not generating resistance to rotation of the cylinder 4.

Embodiment 4

Figure 6:
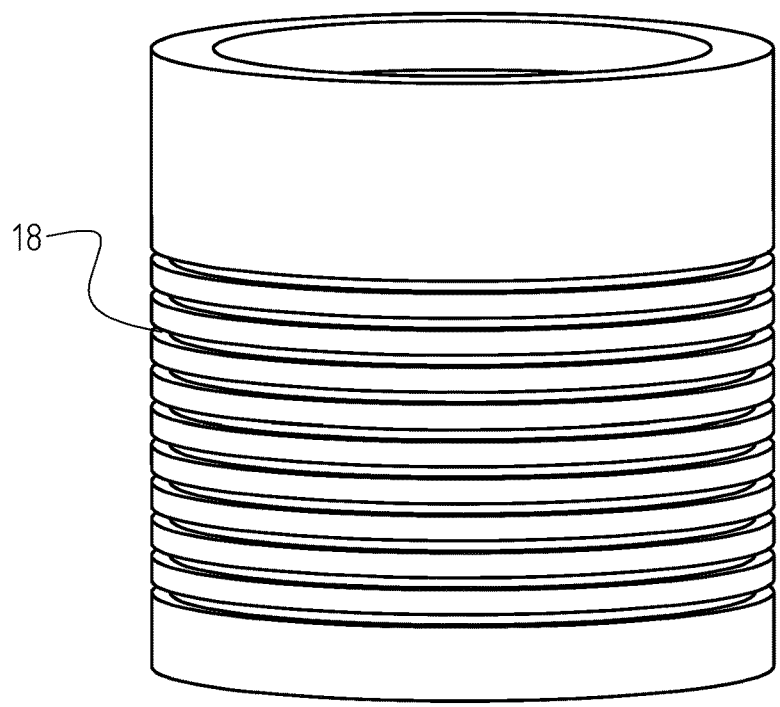
FIG. 6 is a 3d-drawing of a cylinder in embodiment 4.

Referring to FIG. 6, an outer peripheral surface of a cylinder 4 is provided with a plurality of recesses 18 in parallel along an axial direction of the cylinder 4, the recesses 18 are perpendicular to the outer peripheral surface of the cylinder 4 and are arranged radially inward, the recesses 18 is used to receive air flow from air inlet holes 12, the recesses 18 are arranged in parallel with the air inlet holes 12, such arrangement achieves that air flow sweeps across surface of the recesses 18 and takes away heat of the cylinder 4 while not generating resistance to rotation of the cylinder 4.

The invention claimed is:

1. A battery cooling system for energy vehicle comprises a shield boxes (1) with a plurality of batteries (2) installed, wherein an inner wall of the shield box (1) is provided with a condenser pipe (3) filled with coolant, a cylinder (4) rotatably connecting with an inner bottom of the shield box (1), an upper end of the cylinder (4) being provided with a circular groove (5) arranged coaxially with the cylinder (4), the circular groove (5) being sealed and rotated to connect with a circular block (6), a water inlet end and a water outlet end of the condenser pipe (3) being both sealed and penetrated through the circular block (6), a heat insulation plate (7) being arranged in the cylinder (4), the heat insulation plate (7) dividing the cylinder (4) into two insulation chambers of the same size, an upper end of the cylinder (4) being provided with two through holes (8) communicating with the circular groove (5), the two through holes (8) being respectively matched with the water inlet end and the water outlet end of the condenser pipe (3), a driving device for driving the cylinder (4) to rotate being installed in the cylinder (4); the driving device comprises two sliding plugs (9) respectively sealed and slidingly connected in the insulation chambers on both sides of the heat insulation plate (7), an enclosed space formed by the sliding plug (9), the cylinder (4), and the heat insulation plate (7) being filled with a thermal expansion liquid, an iron block (10) being embedded on a side wall of the sliding plug (9), a permanent magnet (11) being installed on a side wall of the shield box (1), two opposite side walls of the shield box (1) being respectively provided with an air inlet hole (12) and an air outlet hole (16), the cylinder (4) and the sliding plug (9) being made of copper material which has good thermal conductivity; an spoiler (13) made of iron is slidingly connected with each side of the heat insulation plate (7), the spoiler (13) being elastically connected to an inner bottom of the cylinder (4) by a spring (15), an electromagnet (14) being installed on a side wall of the shield box (1), the electromagnet (14) being coupled in charging circuit of the battery (2).

\* \* \* \* \*